US008175954B1

(12) United States Patent
Deans

(10) Patent No.: US 8,175,954 B1
(45) Date of Patent: May 8, 2012

(54) METHOD AND SYSTEM FOR OFFERING AND MANAGING AN EXCHANGING OF PROPERTY

(76) Inventor: Robert Paton Deans, Coogee (AU)

( * ) Notice: Subject to any disclaimer, the term of this patent is extended or adjusted under 35 U.S.C. 154(b) by 0 days.

(21) Appl. No.: 09/958,444

(22) PCT Filed: Mar. 16, 2000

(86) PCT No.: PCT/AU00/00196
§ 371 (c)(1),
(2), (4) Date: Jun. 6, 2002

(87) PCT Pub. No.: WO00/60508
PCT Pub. Date: Oct. 12, 2000

(30) Foreign Application Priority Data

Apr. 6, 1999 (AU) .................................... PQ0379

(51) Int. Cl.
G06Q 40/00 (2012.01)
G06F 17/00 (2006.01)
G06F 7/00 (2006.01)
G06F 12/00 (2006.01)
G06F 17/30 (2006.01)

(52) U.S. Cl. ..................... 705/37; 707/705; 707/821
(58) Field of Classification Search ............... 705/1, 37, 705/1.1, 26, 26.1, 27, 27.2, 35; 707/1, 3, 707/100, 104.1, 705, 724, 752, 821
See application file for complete search history.

(56) References Cited

U.S. PATENT DOCUMENTS

| | | | |
|---|---|---|---|
| 5,032,989 A * | 7/1991 | Tornetta | 705/1 |
| 5,414,621 A * | 5/1995 | Hough | 705/10 |
| 5,584,025 A * | 12/1996 | Keithley et al. | 707/752 |
| 5,664,115 A * | 9/1997 | Fraser | 705/37 |
| 5,680,305 A * | 10/1997 | Apgar, IV | 705/7.28 |
| 5,754,850 A * | 5/1998 | Janssen | 707/104.1 |
| 5,774,873 A * | 6/1998 | Berent et al. | 705/26 |
| 5,794,216 A * | 8/1998 | Brown | 705/27.2 |
| 5,802,501 A * | 9/1998 | Graff | 705/36 R |
| 5,857,174 A * | 1/1999 | Dugan | 705/313 |
| 5,926,793 A * | 7/1999 | de Rafael et al. | 705/5 |
| 5,940,807 A * | 8/1999 | Purcell | 705/26 |
| 5,950,175 A * | 9/1999 | Austin | 705/36 R |
| 6,058,379 A * | 5/2000 | Odom et al. | 705/37 |
| 6,292,788 B1 * | 9/2001 | Roberts et al. | 705/36 T |

(Continued)

OTHER PUBLICATIONS

Preyas Desai and Devavrat Purohit; "Leasing and Selling: Optimal Marketing Strategies for a Durable Goods Firm"; Management Science; vol. 44; No. 11; JSTOR; Nov. 1998; pp. S19-S33.*

(Continued)

*Primary Examiner* — Ella Colbert
(74) *Attorney, Agent, or Firm* — Darren Gardner

(57) ABSTRACT

A computer system for offering property for exchange over a computer network includes a master database for storage of information pertaining to the property that is located on at least one master server which can be accessed by an exchangee, e.g. through a browser. The system further includes local agent databases which store information pertaining to property offered for exchange by a particular exchanger. An agent server accesses the master server so as to transfer information stored on an agent database to the master database. The computer system also includes an exchange management program adapted to record information relating to the stages of exchange of property between the exchanger and the exchangees, wherein the exchangees access the master server and request particular information from the master database pertaining to the property.

22 Claims, 4 Drawing Sheets

U.S. PATENT DOCUMENTS

| | | | |
|---|---|---|---|
| 6,397,208 B1* | 5/2002 | Lee | 707/724 |
| 6,484,176 B1* | 11/2002 | Sealand et al. | 1/1 |
| 6,594,633 B1* | 7/2003 | Broerman | 705/313 |
| 6,751,596 B1* | 6/2004 | Hastings | 705/7.31 |
| 2002/0013750 A1* | 1/2002 | Roberts et al. | 705/35 |
| 2003/0083957 A1* | 5/2003 | Olefson | 705/27 |

OTHER PUBLICATIONS

Harps, William S. and Jack Cummings; "The Guide to Real Estate Exchanging"; The Appraisal Journal; Jul. 1994, 62, 3; pp. 478-479.*

Leonard, R.; "Lean, mean, and automated: realtors are using PC's to adapt to hard times"; Information Week, No. 374; May 18, 1992; p. 1.*

Rynkiewicz, Stephen; "Real Estate Industry Puts New Web Markup Language to the Test"; Aug. 9, 1999; pp. 1 and 2.*

Chicago Tribune: "Realtors Develop Cyberspace Fears: On-Line Consumers Could Make Contacts, Deals; Brokers Countering With New system"; Nov. 16, 1995; p. 1.*

San Jose Mercury News; Scott Thurm; "The Productivity Puzzle Technology Seemingly Isn't Boosting Worker Output"; Sunday, Sep. 14, 1997; pp. 1-3.*

PR Newire; "E-Realty.com Closes 35th Transaction, Expansion to Austin Nearing"; Nov. 1, 1999; p. 1.*

PR Newswire; "Supra(R) Introduces New eKey(TM) Portable, Digital Organizer to Enhance Realtor(R) Professionalism and Productivity"; Nov. 1, 1999; pp. 1 and 2.*

Japan-US Business Report; "Japanese Companies in the United states: Construction and Real Estate"; Feb. 1, 1997; p. 1.*

Anonymous; "Catalog cross-sells software"; Catalog Age, v10n,10; Oct. 1993; pp. 1 and 2.*

* cited by examiner

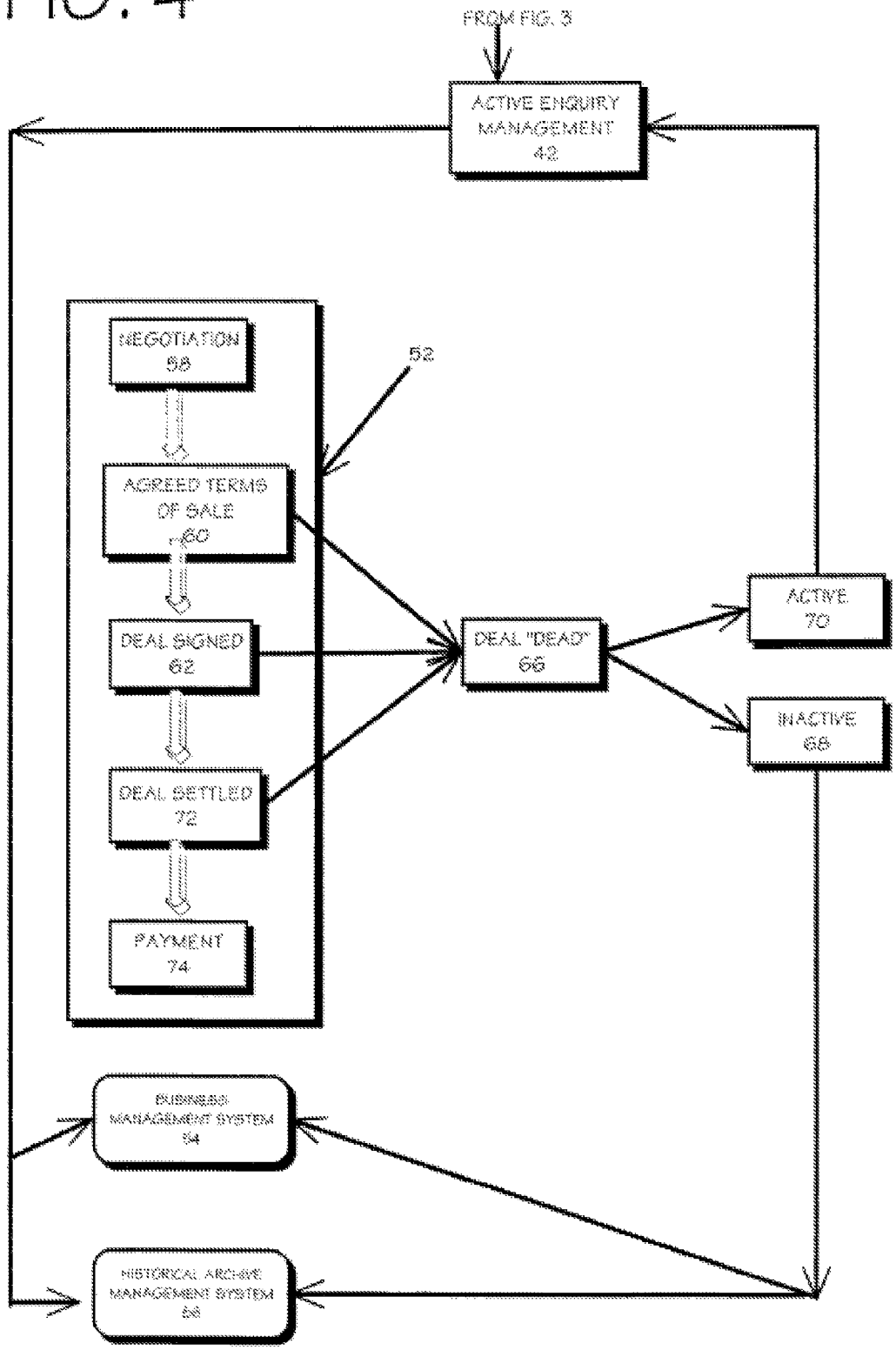

METHOD AND SYSTEM FOR OFFERING AND MANAGING AN EXCHANGING OF PROPERTY

FIELD OF THE INVENTION

The invention relates to a computer system and a method for offering and managing the exchange of property, and in particular real estate property, over a computer network such as the Internet.

BACKGROUND OF THE INVENTION

Computer networks such as the Internet can be used for offering services and products for sale to the public by a business and for business to business transactions. Part of this popularity might be attributed to the fact that a larger number of potential customers/clients can be reached at low cost compared with conventional forms of promoting products/services, such as by brochures and expensive advertising.

In recent times real estate agencies have been offering real estate property services for sale/lease/auction/inspection etc, to the public via the Internet. Typically a person who wishes to use the Internet to purchase a property will access a website and may either manually view each of the properties offered for sale/lease/auction/inspection, or alternatively they may enter a search (for example by location), so as to view those properties which are listed on the real estate Agent's database.

A limitation with this method is that as the Internet can be accessed by any number of people, the real estate Agent will be constrained by the number of properties which they can offer at any one time. It can be difficult for any number of real estate Agents to locate selected property listings on the Internet in a central location and in a format which allows them to update the listings automatically. Hence, the management of up to date information on the website can become cumbersome.

Furthermore, if other Agents wanted to list their properties on another Agents web site, the format in which the data is transferred between the two agencies may not be compatible, and hence there may be difficulties in transferring information.

Additionally, previous methods of selling property via the Internet, have involved mere searching techniques in order to match buyers with sellers. There has been no way of additionally managing or facilitating the exchange of property, during the transaction phase.

SUMMARY OF THE INVENTION

It is an object of the invention to provide an improved computer system for facilitating the exchange of property over a computer network.

According to a first aspect of the present invention, there is provided a computer system for offering at least one property for exchange over a computer network (ie such as the Internet), the properties being offered for exchange by at least one Exchangor to at least one Exchangee, the system including:
- a Master database for storage and dissemination of information pertaining to the properties, the Master database being located on at least one Master server which can be accessed by an Exchangee in order to obtain information relating to said properties;
- at least one Agent database which stores information pertaining to properties to be offered for exchange by one or more Exchangors, each Agent database adapted to access the Master server so as to transfer information stored on said Agent database, to the Master database; and
- a data exchange management program associated with said at least one Agent database, said data exchange management program adapted to manage and record in the Agent database, information relating to the stages of exchange of property between the Exchangor and the Exchangees, wherein information relating to the stages of exchange of property between the Exchangor and the Exchangee is managed and recorded in said Agent database and the Master database is programmed to interface with said Agent databases to receive information relating to new properties, and updated information relating to properties already stored in said Master database, directly from said Agent database.

Advantageously the information pertaining to the property includes a plurality of information items which relate to particular items of a property. The information items of a particular property typically describe unique features of said property and are individually searchable by an Exchangee or Exchangor.

Advantageously tangible services relating to the property may also be offered for exchange to an Exchangee.

Optionally, the system requests a user of the system (ie. such as an Exchangor or an Exchangee), to enter information relating to the criteria for the type of property that the user is interested in exchanging/obtaining. The system may store the Exchangee information on the Master database, which information can be used by the search criteria, to match the search criteria with the information items that are stored on the Master database. Typically, a number of matched items will result and the user can be presented with a number of properties that have been matched with the search criteria.

The system may also allow a user to enter further search criteria so that the number of properties which have been matched are reduced so that the user obtains details of those properties that are of the most interest to them.

In one embodiment of the present invention, the property is real estate property offered for exchange to an Exchangee (ie. such as a real estate purchaser or leasee), by way of a sale or lease. In such an embodiment, the information items relating to the real estate property can include information items relating to the particular features of the property, such as location, price, size of the property, number of bedrooms, photos, contracts, plans or video programs etc.

The Master database may be a relational database so that the information items stored within the database is structured to recognise the relationship of the stored information to a particular property to other properties. In this regard, a first item of property which relates to a second item of property, may be presented to a user on a first web page which is linked to a second web page (ie. such as via a hypertext link). For example, if the first item of property related to a shop unit and was located within a shopping complex, the shop unit itself could be offered for lease and the details of this property would be presented to a user on a first web page. On the first web page, a hypertext link could exist to a second web page providing information regarding the shopping complex in which the shop unit is located. Such a feature allows a person considering leasing the shop unit with an opportunity to consider the amenities that may be offered by the shopping complex. Furthermore, there may be further links to other shop units within the complex, that are offered for lease and/or sale from the web page of the shopping complex.

Advantageously the data exchange management program also include a transaction management program which assists a user in managing a property exchange transaction. Once an Exchangee has selected the item of property that they are considering exchanging (ie. for money), the data exchange management program will assist the user in negotiating the exchange by managing and recording the stages of the property transaction.

Typically, once an Exchangee has considered the item of property and has expressed an interest in entering into negotiations with the Exchangor of the item of property, the transaction management program records that the two parties are in negotiation. The Exchangee may express interest in the item of property by selecting an "ENTER TRANSACTION" link object located on the dedicated web page of the item of property. This information is then typically submitted to the Exchangor of the item of property.

If the two parties come to agree on the initial offer, then they may enter into discussions as to the agreed terms of the transaction, otherwise the status of the transaction is recorded as "dead" by the transaction management program and negotiations do not go any further.

Once the agreed terms of the transaction have been settled, the status of the transaction is then recorded in the database by the data exchange management program as a record within the Agent database.

After the agreed terms have been recorded, an Agreement may be generated by the Agent database, and a hard copy of the Agreement may then be signed by the two parties. Settlement can thus reached and payment made by the Exchangee to the Exchangor. In this way all stages of the transaction are recorded by the transaction management program and a historical record of the transaction is maintained.

An Agent database may be managed by a particular Exchangor, such as an Agent Exchangor.

The Agent Exchangor may select particular properties that they wish to offer for exchange over the Internet and then upload the information pertaining to these particular properties to the Master database. The Agent Exchangor is able to access the Master database via the Master server, by being allocated an authorised user identification and a verification password.

According to a second aspect of the present invention, there is provided a method for offering at least one property for exchange over a computer network (ie such as the Internet), the properties being offered for exchange by at least one Exchangor to at least one Exchangee, the method including the steps of:

provalidinga Master database for storage and dissemination of information pertaining to the properties, the Master database being located on at least one Master server which can be accessed by an Exchangee in order to obtain information relating to said properties;

providing at least one Agent database which stores information pertaining to properties to be offered for exchange by one or more Exchangors, each Agent database adapted to access the Master server so as to transfer information stored on said Agent database, to the Master database; and providing a data exchange management program associated with the at least one Agent database, said data exchange management program adapted to manage and record in the Agent database, information relating to the stages of exchange of property between the Exchangor and the Exchangees, wherein information relating to the stages of exchange of property between the Exchangor and the Exchangee is managed and recorded in the Agent database and the Master database is programmed to interface with the Agent database to receive information relating to new properties, and updated information relating to properties already stored in the Master database, directly from said Agent database.

Preferably said stages of exchange of said property is recorded as data and includes any one or more of the following stages of exchange: negotiation of exchange of said property; agreed legal terms of exchange of said property; details of signed deal of said property exchange; settlement of said exchange; payment of said property.

Where in the specification the term "database" is used, the term refers not only to a collection of structured data, but also includes within its scope, a database management system having software that handles the storage, retrieval and updating of data in a computer and integrating the data with other files and/or applications.

Where in the specification the term "property" is used, the term includes within its scope not only real estate property, but businesses, time share offerings, or vendible articles such as cars and marine vessels.

Where in the specification the term "exchange" is used, the term includes within its scope a sale, lease, hire offering, or auction.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 4 illustrates the stages involved in recording a transaction during the exchange of property from the inquiry stage to the finalisation of the transaction.

DETAILED DESCRIPTION OF THE EMBODIMENTS

Figure 1:
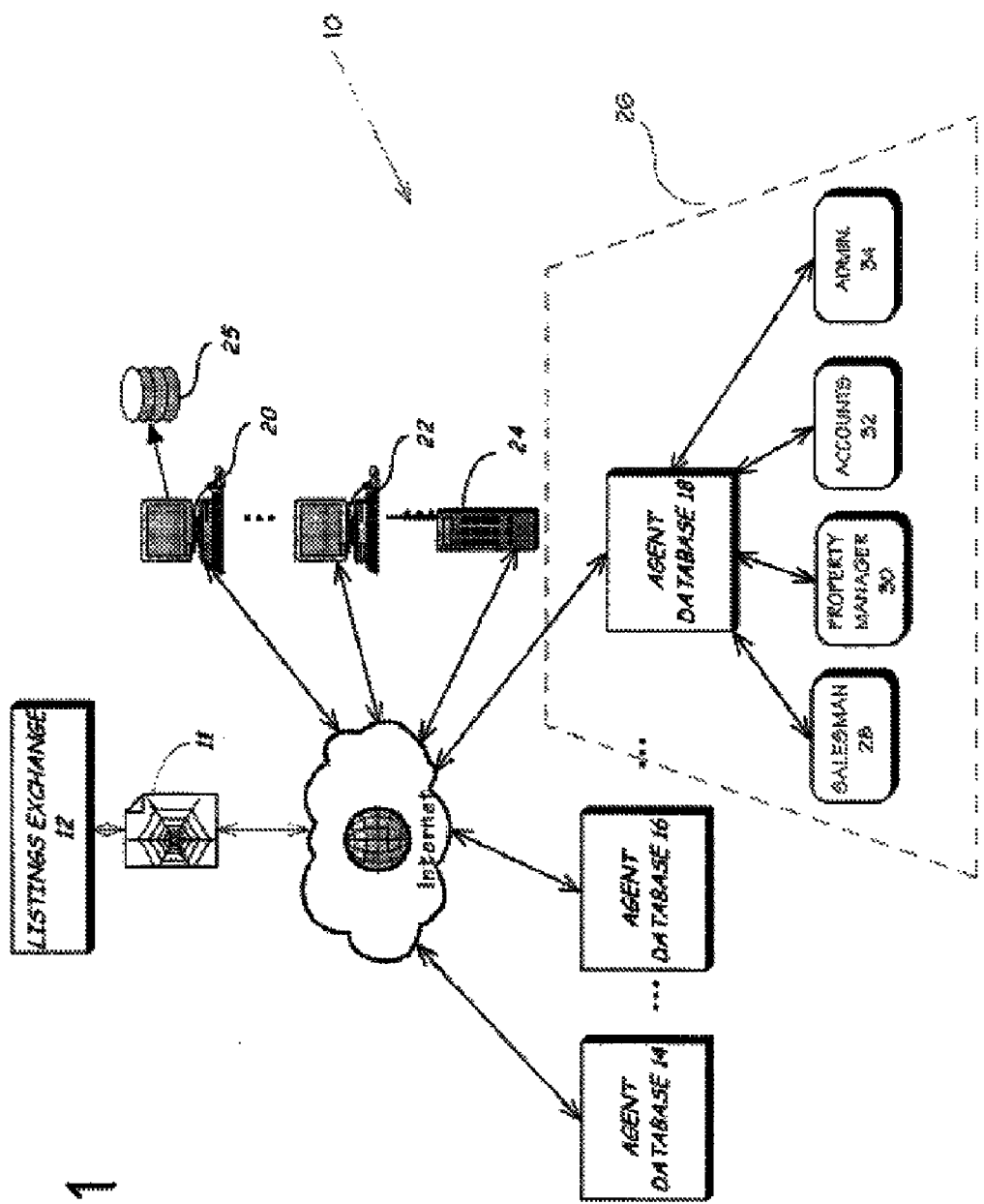
FIG. 1 is a schematic illustration of an embodiment of a computer system in which Exchangors offer property for exchange over the Internet, to potential Exchangees.

Referring to FIG. 1, there is shown a computer system 10 for offering property which in this embodiment, is real estate property, over the Internet. The information relating to the property is listed on a Master database located on a Master server and is shown generally as listings exchange database 12. The information stored as records in the listings exchange database 12, can be accessed from a dedicated listings exchange website", which presents the information on a web page, so that the information is accessible by a number of other Agents databases shown generally as 14,16 and 18.

Additionally, the listings exchange database 12 can also be viewed by any person on the Internet such as shown by persons using computer connected to the Internet 20,22 or mobile phone 24 having Wireless Application Protocol (WAP) technology. Internet browsers provided on the computers 20,22,24 can be used to locate and/or download the web page 11 of the dedicated listings exchange database 12 website. It can be seen that person using browser 20, also has access to their own personal database 25, which is able to interface with the information located on the listings exchange, as will be described below.

The Agent database 18 is used by a number of persons involved with the management and operation of a real estate agency, shown by broken lines 26. The Agent database 18 resides on a dedicated server for the real estate agency 26.

The information on the Agent database 18 may be used by a number of people within the real estate agency 26, who are involved in the management and facilitation of the sale, lease or auction of real estate property. The property salesmen 28, the property manager 30, the accounts department 32 and the agency administration 34, can all use the Agent database as a record keeping system and for general operation of the real estate agency 26. It will be realised that the information on the Agent database 18 may also be used for other business purposes, such as for marketing.

All of the property listings for each of the properties under the management of the real estate agency 26 are on to the Agent database 18. From time to time when it is desired that certain properties are to be offered for sale, auction or lease over the Internet, the salesman 28 selects those properties listed on the Agent database 18, and enters a request to the Agent database 18, that these properties be listed on the listings exchange database 12.

In order to list the selected properties of Agent database 18 onto the listings exchange database 12, the server on which the Agent database 18 resides (not shown), connects to a server containing HTML data representing web page 11, which also allows access to the listings exchange database 12. The listings exchange database 12 is then updated with the new listings property selected from the records of Agent database 18.

The software of the Agent database 18 is compatible with the software of the listings exchange database 12, so that information between the databases can be transferred.

It should be realised that Agent databases 14 and 16 are also managed and run by other real estate agencies (not shown), and that any number of agencies can be connected to the listings exchange database 12 via the Internet.

Each of the real estate properties which are stored as records in the Agent database 18, store information criteria pertaining to the particular item of property which the real estate agency 26 is offering for sale. The information items combined together provide a summary description of the property which is being offered for sale, lease or auction over the Internet. For example, the criteria might include the building type (ie. whether it be a house, townhouse, unit, office block or some other commercial property), the price range of the property being offered for sale, the number of rooms, the floor size and the location etc.

This criteria can be used by any person who accesses the listings exchange database 12 via the Internet, to search for a property according to the recorded information. For example, person using web browser on computer 20 may search for a house located within a particular area and of a certain price range and of a particular description (ie. they enter the location of where they would like to buy and the number of bedrooms), by entering search information on a virtual form located on the web site 11 to access the listings exchange database 12 and present it to a user of computer 20.

The search information is then sent to the listings exchange database 12, wherein the search information is matched with those properties recorded on the listings exchange database 12 whose information criteria corresponds with the search information. A list of matched properties (any one of the listed properties could have originated from any one of the Agent databases 14,16 and 18), can then be downloaded and presented to the person using computer 20.

Computer 20 may have installed a "personal" database manager 25, which can be downloaded from the web site 11 of the listings exchange database 12. The-personal database manager 25 records those properties which have been matched and downloaded as described above, and allows a person to select from the matched property list, those properties of which they would like to make an 'active inquiry'.

An active inquiry results when the person using web browser 20, wishes to find out further information in regard to the selected property from the real estate agency with which the property is listed. This arrangement allows the personal database manager 25 able to communicate directly with any one of the Agent databases 14,16 or 18, so that the active enquires may be communicated to the real estate agency responsible for the real estate property listed on the exchange and active inquiry may be automatically recorded in the Agent databases of the real estate property. The active inquiry may be communicated directly to the real estate agency by electronic mail when the property is selected as an active inquiry in the personal database manager 25. Direct and automatic communication is possible as the software of the personal database manager 25 has interface compatibility with the software of the agency database.

Alternatively, an active inquiry for a particular property listing may also be communicated to a property consultant who acts on behalf of the person using computer 25, with the real estate agency responsible for the listed property which is an active inquiry.

It will be appreciated that as any number of Agent databases may store information on the listings exchange database 12, persons using computer 20,22 or WAP phone 24, are not restricted to one particular agency's database, but can access listings exchange database 12 which contains information from the databases 14,16 or 18 and any database listed with the Listings Exchange 12. Furthermore as the Agent databases 14,16 and 18 each have access to the listings exchange database 12, which has compatible software as that of the listings exchange database 12, all of the information can be easily updated.

Figure 2:
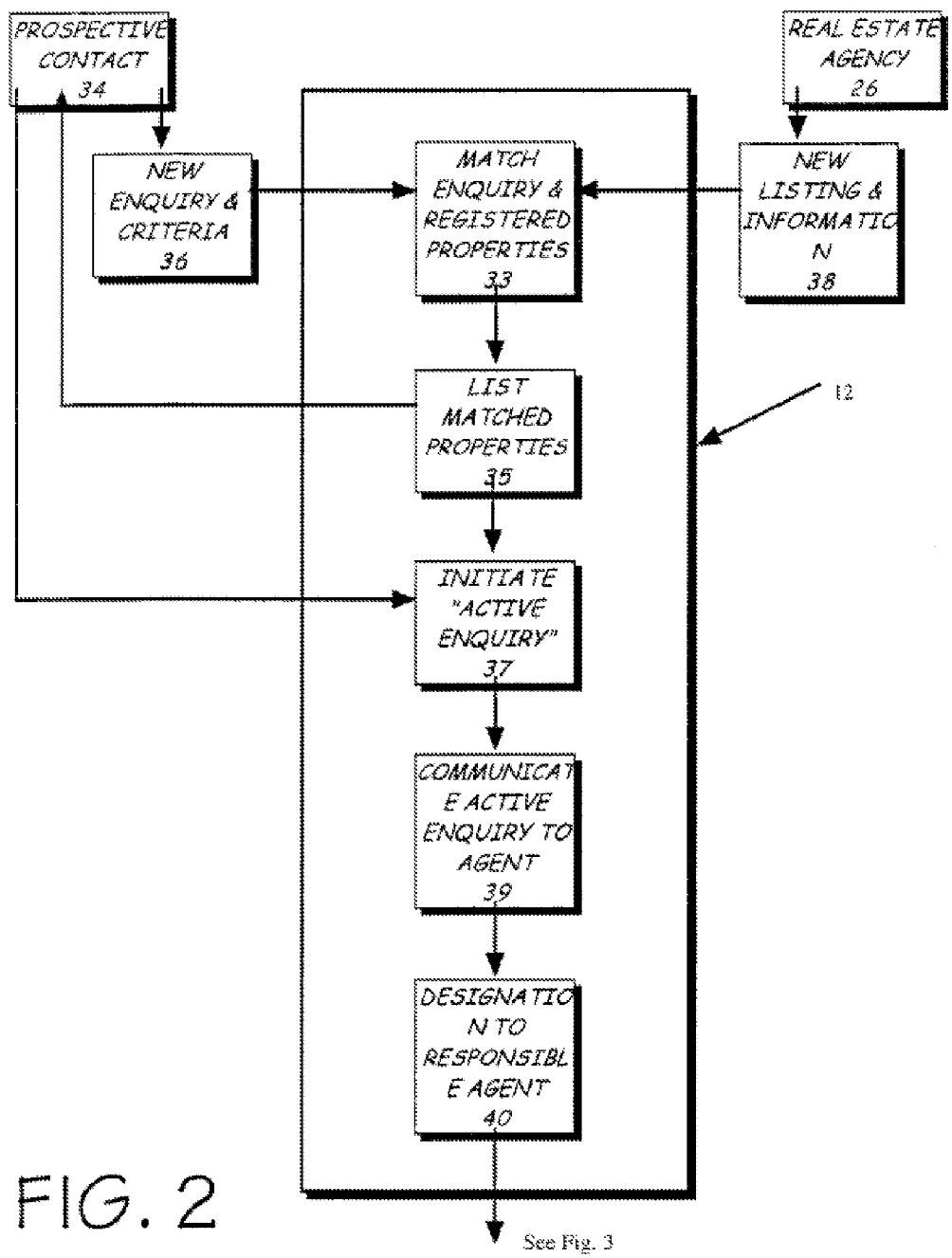
FIG. 2 is a schematic illustration of a first set of exchange stages for the computer system of FIG. 1.
Figure 3:
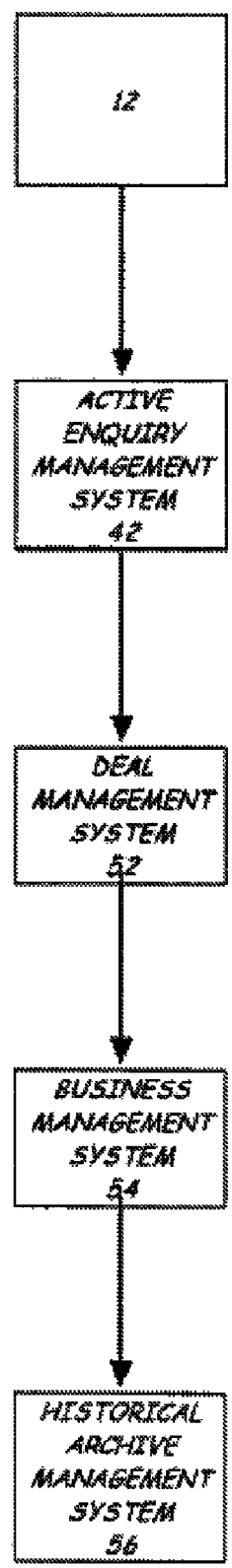
FIG. 3 is a schematic illustration of a further second set of exchange stages for the computer system of FIG. 2.

FIG. 2 and FIG. 3 shows in further detail, the stages by which an Exchangor and an Exchangee may be matched by the computer system 10 to exchange property which in this example, is real estate property, via the Internet.

A potential Exchangee is shown in the form of prospect contact 34 who downloads the web site 11 of the listings exchange database 12. He/she initiates a "new inquiry" at stage 36, for a real estate property detailing the criteria for the property that they are interested in obtaining (as described above). Likewise, new listings at stage 38 from a real estate agency have been stored as records in the listings exchange database 12, in addition to the-information describing these properties.

The new inquiry criteria from stage 36 is then matched with stored information for the properties at stage 33 so as to generate a list at stage 35 which is output back to the prospective contact 34. The matched list are the output of the stored properties that are within the inquiry criteria.

The prospect contact 34 then selects (at stage 37), those properties of which they want to enter into an 'active inquiry' (as described above). In this way, the prospective contact 34 has qualified themselves as an active inquiry. Those properties which have been selected as active enquires at stage 37 are communicated as described above, to the responsible Agent (stage 40) who has the listing, the active inquiry properties.

Once an active inquiry has been initiated by prospective contact 34, it is recorded in an active inquiry management system 42 located on an agency database associated with agency 26 (ref FIG. 1). The active inquiry management system 42 assists a real estate agency in handling the active inquiry by automatically generating reminders to the agency 26 that an active inquiry has been initiated and further assists the agency 26 in preparing sales material and further information relating to the properties which have been selected. Various functions that can be performed automatically by the active inquiry management system 42 in handling an inquiry through to the negotiation stage, for example, the active inquiry management system 42 allows an Exchangor such as a real estate Agent to manage the new inquiry 36 by generating prompts to contact the prospective contact 34 at the various stages of the inquiry. For example after the prospect contact 34 has been offered a list of properties which have been matched against their inquiry 36, an operator of the active inquiry management system is then reminded to contact the prospect contact 34 after a period of time in which the prospect contact 34 can consider the properties which have been matched.

A search may be first conducted on the listings exchange database 12 via the Internet, to match listed properties thereon with the requirements of the inquiry 36, another search may be conducted on the agency database associated with agency 26. In this regard, as the Agent database uses the same software program as the listings exchange database 12, a search for a prospective contact may be conducted on the Agent database associated with the agency 26.

Should a property which has been in the active inquiry stage progress further to the initiation of an actual offer by the contact 34, the initial offer will be recorded in a deal management system 52 which will be described further below.

Once the deal management phase has been finalised, all records of financial transactions are kept and maintained in a business management 54 system. This system may be used for accounting purposes by the Agency 26. After the transaction has either terminated or finalised, a historical record of the deal management sequence is then kept in the historical archive management system 56 so that records can be retrieved for information purposes and so as to note that a particular prospect has already viewed and negotiated with a prior listing.

FIG. 4 illustrates the various stages that are carried out by the deal management system. Each of the arrows represents flow of a data via a bus in a physical system.

The prospective contact 34 and the agency 26 (who in this case acts for the owner of a property) enter the negotiation stage 58, in which the two parties negotiate the terms by which the transaction of the real estate property shall take place. For example they shall negotiate the price of the property and the conditions of sale (ie. such as the amount of deposit). Once the negotiation process has been completed the parties then proceed to the agreed terms of sale for the property (stage 60).

The terms of the Agreement and the stages of negotiation to which the two parties have been engaged are recorded in the historical archive management system 56, so that accurate records are kept of all stages of the negotiation. The information may be uploaded from the historical archive management system 56 for dissemination on the listings exchange 12 database and can be used as a historical transaction record for comparison, use, or purchase, for other properties recorded on the listings exchange database 12.

Additionally, the records of the stages of negotiation may be done in real time if the negotiation is done via the Internet, ie. such as via email or via verbal communication, formatted in TCP/IP code or from input of a "visual form" in HTML code.

Once the agreed terms have been completed the deal is then signed (stage 62) and again may be uploaded to the listings exchange database 12. A hard copy can be printed by downloading a copy of the Agreement in PDF format generated by the deal management system 52 so that each party can sign the Agreement.

At any stage of the transaction from 58-62, the process can be terminated as shown via arrow 64 and the deal is then recorded as being "DEAD" at stage 66. Hence, from the time the deal goes to dead at stage 66, the prospect may indicate that they are no longer wishing to pursue any further enquires and the deal management system records the inquiry as "INACTIVE" at stage 68. Alternatively the inquiry might be recorded as "ACTIVE" at stage 70 and the process is repeated back to the active inquiry management system 42.

Should however the deal have been signed, the property is then settled at stage 72 which is again recorded by the deal management system 52 in the Agent database of agency 26, and then final payment is received at stage 74.

This information data for the stages of exchange of property in steps 58 to 74 may include the date and time of the stages of transaction, any monetary amount (ie such as sale value), terms of any legal agreement reached between the Exchangor and Exchangee and any specialised notes concerning the exchange (ie such as notification by the Exchangor or Exchangee that a property has certain defects such as cracks in the walls).

As the Agent databases 14,16 18, and the listings exchange database 12 have compatible software and records coterminous fields relating to the real estate property, it is efficient for new properties to be uploaded from the agency databases to the listings exchange database 12.

Additionally, this prevents re-entry of data which saves time and reduces the occurrence of errors. Consequently, the maintenance of accurate information is possible for the listings exchange database.

The software for the Agent databases may also be downloaded from the website of the listings exchange database 12. In this way, any number of Agent databases may add properties to the listings exchange database 12, which provides a greater selection of properties available to a person searching the database.

All stages of the deal management system may be recorded and historical data kept by the deal management database. Hence, reliable information as to the time taken and processes involved in selling the property can be recorded. This allows a manager of such a business as a real estate agency to determine the performance of each sales person who is selling the property, the likelihood and ease with which the property is being sold and any historical data which may be used to determine the profits generated by the sale, dependent upon the time spent by the person selling the property. In this way better records and management of the operations of the real estate agency can be kept and the sale of property is facilitated by the improved record keeping system.

It should be realised that although the invention as hereinbefore described relates predominantly to real estate property it may also relate to other forms of property such as boats, cars and furniture businesses, services, hotel accommodation etc.

The foregoing describes embodiments of the present invention and modifications, obvious to those skilled in the art can be made thereto, without departing from the scope of the present invention. For example, the exchange of property may be over any form of computer network such as the Internet, an Intranet or a telecommunications system with WAP capability.

The invention claimed is:

1. A method for offering properties for exchange over a computer network, the properties being offered for exchange by an Agent acting on behalf of at least one Exchangor to at least one Exchangee, the method including the steps of:
   providing a Master database for storage and dissemination of property listings comprising information pertaining to the properties, the Master database being located on at least one Master server configured for accessing and viewing by an Exchangee to obtain information relating to said properties, the Master server comprising Agent database software;
   downloading the Agent database software from the Master server to at least one Agent server;
   providing from the Agent database software downloaded to an Agent server of the at least one Agent servers at least one Agent database on the respective Agent server which stores information pertaining to properties offered for exchange by one or more Exchangors, each Agent database configured to access the Master server to transfer information stored on said Agent database to the Master database;
   providing a data exchange management program associated with the at least one Agent database, the data exchange management program being configured to manage and record in the Agent database information relating to the stages of exchange of property between an Exchangor and an Exchangee;
   receiving new property listings into the Agent database;
   receiving management of existing property listings into the Agent database, using the data exchange management program;
   receiving an indication via the data exchange management program in the Agent database of property listings which the Agent selects for uploading from the Agent database to the Master database;
   providing a connection between the Master database and the Agent database to enable said selected property listings for uploading from said Agent database to said Master database; and
   receiving information relating to said selected property listings in said Master database, and causing said selected property listings to be disseminated by said Master database.

2. The method as claimed in claim 1, wherein said stages of exchange of said property is recorded as data, said recorded data relating to any one or more of the following stages of exchange: negotiation of exchange of said property; agreed legal terms of exchange of said property; details of signed deal of said property exchange; settlement of said exchange; or payment of said property.

3. The method as claimed in claim 2, wherein said recorded data relates to any one or more of the following information items: date and/or time of stages of exchange of said property; monetary amount of exchange of said property; specialised notes between the Exchangee and Exchangor concerning the exchange; real estate property location; price; property size; number of bedrooms; photos; contracts; plans; or video programs.

4. The method as claimed in claim 1, wherein said information pertaining to said property includes a plurality of information items which relate to particular items of a property, each of said information items being individually searchable by an Exchangee or Exchangor.

5. The method as claimed in claim 4, wherein said property is real estate property offered for exchange to an Exchangee, by sale or lease.

6. The method as claimed in claim 1, said method further including the step of receiving inquiry information from an Exchangee relating to the criteria for the type of property for which the Exchangee is searching.

7. The method as claimed in claim 6, wherein said property is real estate property offered for exchange to an Exchangee, by sale or lease.

8. The method as claimed in claim 1, said method further including the step of storing Exchangee information on said Master database.

9. The method as claimed in claim 1, wherein said property is real estate property offered for exchange to an Exchangee, by a sale or lease.

10. A computer system for offering properties for exchange over a computer network, the properties being offered for exchange by an Agent acting on behalf of at least one Exchangor to at least one Exchangee, the system including:
    a Master database for storage and dissemination of information pertaining to the properties, the Master database being located on at least one Master server comprising at least one processor and operatively associated memory, the Master server configured for accessing by an Exchangee to obtain information relating to said properties, the Master server comprising Agent database software;
    at least one Agent server configured to download the Agent database software from the Master server to the respective Agent server;
    at least one Agent database coterminous with the Master database which stores information pertaining to property listings offered for exchange by one or more Exchangors, each Agent database configured to access the Master server to transfer information stored on said Agent database to the Master database, the at least one Agent database being provided from the Agent database software and being located on the at least one Agent server;
    a data exchange management program associated with the at least one Agent database, the data exchange management program being configured to manage existing property listings in the at least one Agent database, receive management of existing property listings and record in the at least one Agent database information relating to the stages of exchange of property between an Exchangor and an Exchangee; and
    a connection between the Master database and the Agent database to enable selected property listings for uploading from said Agent database to said Master database, and receive information relating to said selected property listings in said Master database, and cause said selected property listings to be disseminated by said Master database.

11. The computer system according to claim 10, wherein information pertaining to the property includes a plurality of information items which relate to particular items of a property and the information items are individually searchable by an Exchangee or Exchangor.

12. The computer system as claimed in claim 11, wherein the data exchange management program further includes a transaction management program to assist a user in managing a property exchange transaction.

13. The computer system as claimed in claim 10, wherein the data exchange management program further includes a transaction management program to assist a user in managing a property exchange transaction.

14. The computer system as claimed in claim 13, wherein said transaction management program assists an Exchangor in negotiating the exchange by managing and recording the stages of exchange of the property transaction.

15. The computer system as claimed in claim 14, wherein said transaction management program records an Exchangee's expression of interest in entering into negotiations with an Exchangor for an item of property.

16. The computer system as claimed in claim 15, wherein said transaction management program records that the two parties are in negotiation.

17. The computer system as claimed in claim 16, wherein said system includes a historical management database to record events associated with the exchange of property.

18. The computer system as claimed in claim 15, wherein said transaction management program records that the two parties have terminated negotiation.

19. The computer system as claimed in claim 13, wherein said system includes a historical management database to record events associated with the exchange of property.

20. The computer system as claimed in claim 14, wherein said transaction management program records that the two parties have terminated negotiation.

21. The computer system as claimed claim 10, wherein said system includes a historical management database to record events associated with the exchange of property.

22. The computer system as claimed in claim 10, wherein said at least one Agent database resides on a different server than the server on which said at least one Master database is located.

* * * * *